Sept. 30, 1924.                                                   1,509,877
                          J. D. RICHIE
                          TIRE CHAIN
                       Filed Aug. 21, 1923

Inventor
J.D.Richie,
By Ralph T. Bassett
Attorney

Patented Sept. 30, 1924.

1,509,877

UNITED STATES PATENT OFFICE.

JOSEPH D. RICHIE, OF CASPER, WYOMING.

TIRE CHAIN.

Application filed August 21, 1923. Serial No. 658,539.

*To all whom it may concern:*

Be it known that JOSEPH D. RICHIE, a citizen of the United States, residing at Casper, in the county of Natrona and State of Wyoming, has invented certain new and useful Improvements in Tire Chains, of which the following is a specification.

The object of this invention is to provide a chain construction which will avoid the disadvantages of the conventional type of tire chain and at the same time will embody important features heretofore unknown in the art.

The construction includes the usual side chains which extend around and grip the side walls of a tire and the usual cross chains which extend transverse to the side chains and are spaced equidistant to provide for the arrangement of diagonal cross chains at the present time little used.

One of the main features of this invention is the particular construction and arrangement of these diagonal cross chains whereby equal distribution of strain is obtained; also the arrangement of these diagonal cross chains with relation to the transverse cross chains which provides a smooth tractive surface which is distinctively advantageous.

Another novel feature resides in the construction of the locking members which are inexpensive to manufacture and which provide for the quick adjustment and fastening of the chain terminals.

Other objects will hereinafter appear by reference to the accompanying drawings forming a part of this specification and wherein like numerals of reference designate corresponding parts throughout the several views, in which:—

The present construction includes the two side chains A and B which are connected by a plurality of cross chains. The transverse cross chains C are spaced substantially equal distance apart, the distance between two adjacent chains C being less than the distance between the side chains A and B, thereby forming rectangular spaces in which are located cross chains D. These cross chains D are attached to the links $a$ adjacent the links $b$ to which the cross chains C are attached and are connected to a central ring E as is common in the art. By this arrangement the present disagreeable noise is avoided which is caused by the space between the chains being of such a distance as to permit the engagement of the tire with the ground between the cross chains. It will also be noted that the cross chains D are slightly flexed as compared with the cross chains C which permits better play and gripping action during lateral movement of the wheel on which they may be placed.

Figure 1:
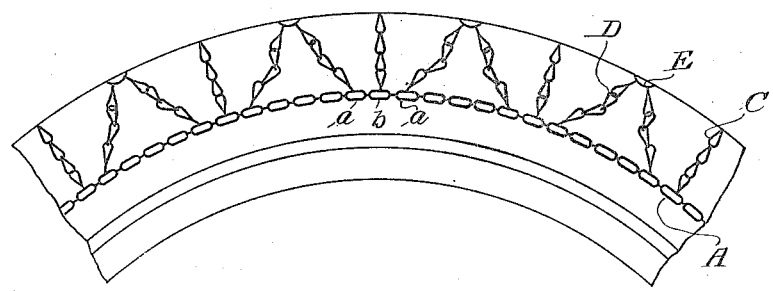
Figure 1 is a side elevation of a portion of a tire showing the present invention in position.
Figure 2:
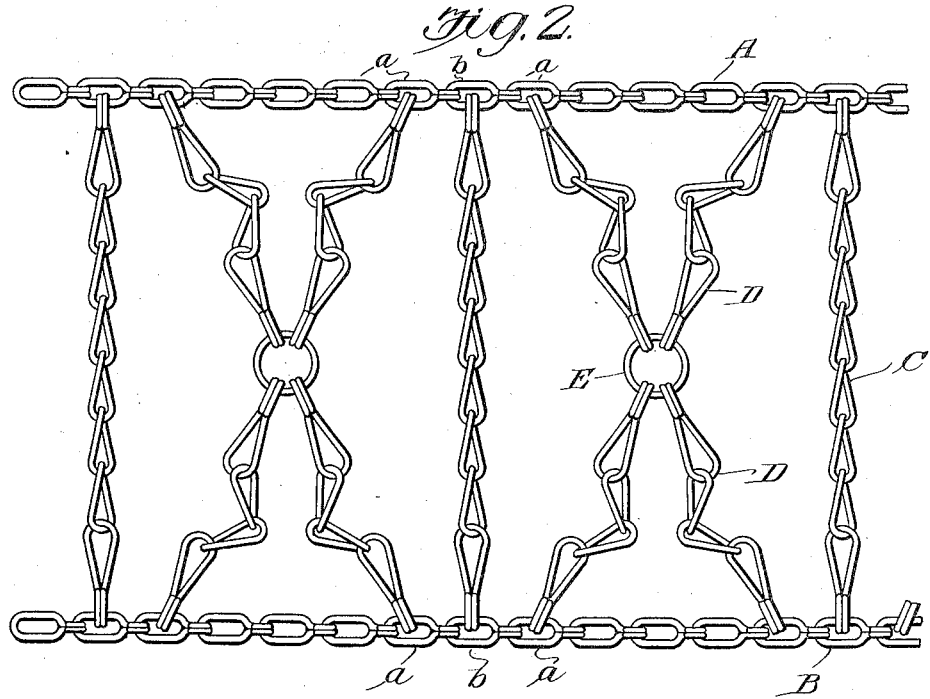
Figure 2 is a top plan view of a section of the chain.
Figure 3:
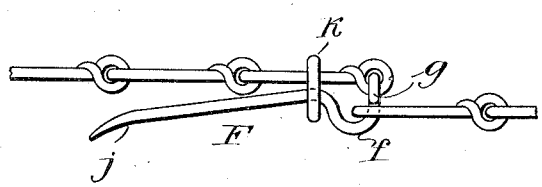
Figure 3 is a top plan view of the fastener connecting chain fragments.

In Figure 3 I have shown the preferred form of fastening which is in the nature of a cam hook, the hook member F being formed by bending a suitable piece of wire adjacent one end into an open loop $f$, the end $g$ adjacent the loop being loosely wrapped to a link to form a pivot and the opposite end $j$ tapering and flaring outwardly to provide a suitable handle. The handle is threaded through any desired link and swung on its pivot until the portion of the shank adjacent the loop is as close as possible to the chain and the ring $k$ is then moved into position to engage both the side chain and the shank. Due to the flaring handle, the tension exerted on the portion $f$ will be sufficient to hold the ring $k$ in position.

Attention is now directed to the fact that the diagonal chains are connected to the link adjacent the connection with the transverse cross chains as by this arrangement it has been found that practically a continuous gripping surface is provided which avoids the vibrations caused by the ground surface first engaging the tire surface and then the chain surface as is now the case.

The peculiar construction and arrangement of the two types of cross chains accommodates for any lateral stress or strain and provide against any tendency on the vehicle using same from slipping or skidding in any direction. This is particularly vital in hauling over dirt roads such as are common in oil fields and where the slightest amount of play caused by unsatisfactory chains may result in the control of the vehicle being lost by the driver due to the enormous weights carried.

Other advantages will appear to one familiar in the art.

What I claim as new and useful and desire to secure by Letters Patent is:—

A non-skid structure for automobile tires comprising a plurality of longitudinal side chains formed of ordinary links and adapted to extend entirely around an automobile tire and to engage the side surfaces of the latter, equally spaced transverse chains connecting the side chains and each adapted to extend from one side chain over the tread of the tire to the opposite side chain, and a pair of diagonal crossed chains arranged between each two adjacent transverse chains and having their ends connected to the links of the side chains, said crossed chains being of such length as to pass over the tread of the tire without pulling the side chains toward said tread, and said diagonal chains having the links thereof normally out of alignment.

In testimony whereof I affix my signature.

JOSEPH D. RICHIE.